Nov. 21, 1939.    R. W. HALL    2,180,983
DYNAMO-ELECTRIC MACHINE
Filed March 24, 1938
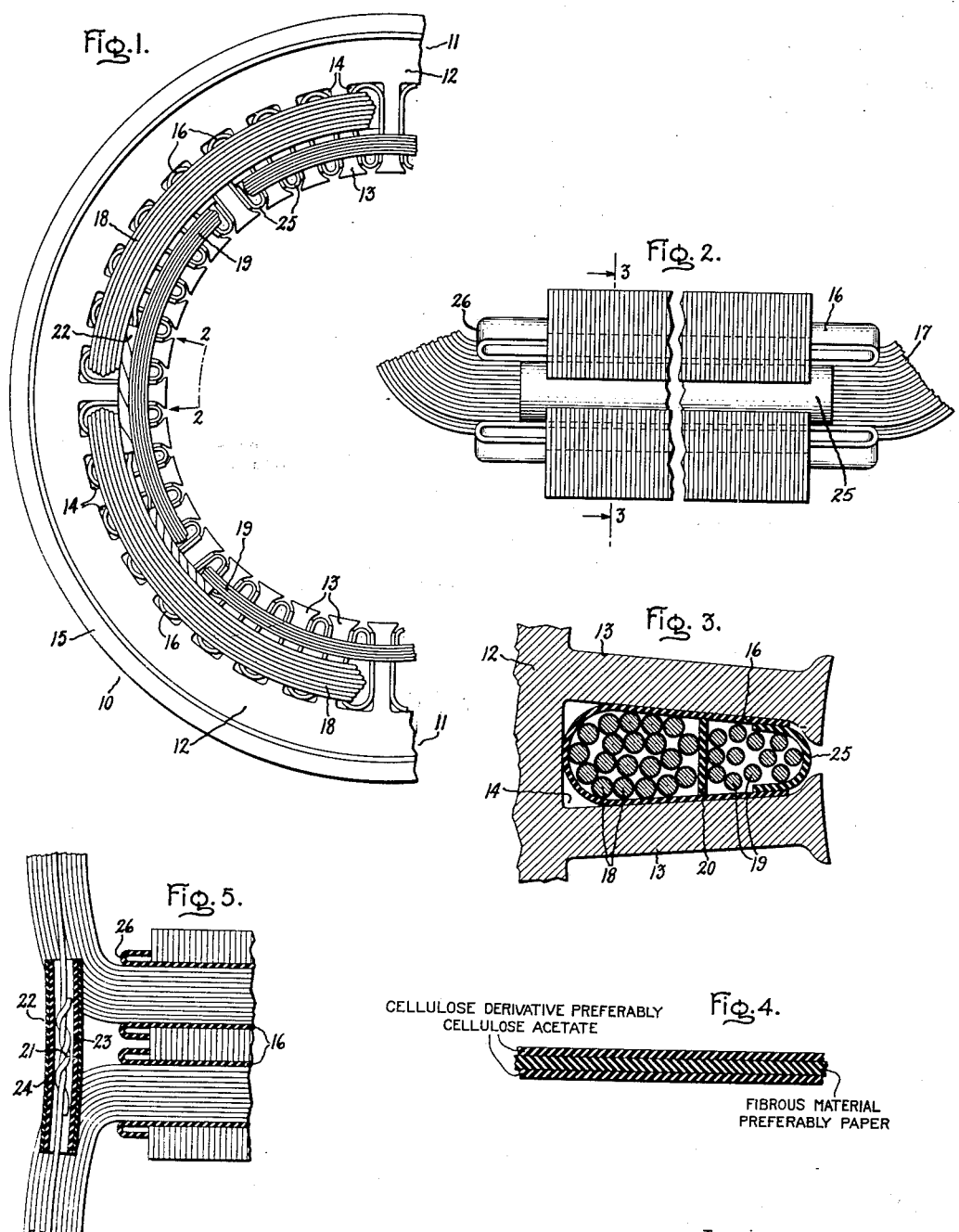
Inventor:
Ralph W. Hall,
by Harry E. Dunham
His Attorney.

Patented Nov. 21, 1939

2,180,983

UNITED STATES PATENT OFFICE 2,180,983

DYNAMO-ELECTRIC MACHINE

Ralph W. Hall, Fort Wayne, Ind., assignor to General Electric Company, a corporation of New York Application March 24, 1938, Serial No. 197,801

12 Claims. (Cl. 171—252)

This invention relates to dynamo-electric machines, and more particularly to certain improvements and modifications in the insulation of such machines.

Heretofore in the manufacture of dynamo-electric machines, for example small motors, it has been common practice to immerse parts thereof, for example a wound stationary member or stator, in an insulating varnish and thereafter to bake the impregnated stator in an oven for 4 to 8 hours at a temperature of about 100° to 150° C. The object of such treatment is primarily to moisture-proof the paper, vulcanized fiber, cotton cloth or similar insulating material used in the construction of the stator. This varnish treatment is time-consuming and expensive, and materially increases the cost of constructing a motor. Further, when using conductors insulated solely with an organic enamel of the oleo-resinous type, the impregnating varnish has a detrimental effect upon the conductor insulation. Also, the temperatures necessary to cure or harden the impregnating varnish are sufficiently high to embrittle or otherwise injure the conductor insulating film, as well as the other component parts of the insulating system such, for instance, as the paper slot insulation, rubber-covered leads, etc. For example, the enamel film on the wire often is ruptured when the film on the wire is stretched upwards of 30 per cent, and the stretched insulated wire then contacted with hot impregnating varnish.

It is a principal object of the present invention to simplify the insulation of members of dynamo-electric machines so that they can be produced easily and cheaply with a minimum expenditure of labor and material, and without the necessity for a varnish treatment.

Another object of the invention is to provide an insulating system for dynamo-electric machines which provides lower leakage current values than those commonly obtained by previous practice and which results in better motor performance, particularly under high humidity conditions.

The novel features of my invention are set forth in the appended claims. The invention itself, however, will be understood most readily from the following detailed description thereof when considered in connection with the accompanying drawing, which is representative of one emobdiment of the invention, and in which Fig. 1 is an end view of a portion of a member, specifically a stator, of a dynamo-electric machine embodying my invention;

Fig. 2 is an enlarged, elevational, fragmentary view of a stator slot taken on the line 2—2 of Fig. 1;

Fig. 3 is an enlarged sectional view taken on the lines 3—3 of Fig. 2;

Fig. 4 is a diagrammatic sectional fragmentary view which illustrates one embodiment of the insulating material used in practicing the present invention; and Fig. 5 is an enlarged elevational view, partly in section, of two adjoining insulated slots with coil sides or windings therein.

Referring to Fig. 1 of the drawing, the portion of a dynamo-electric machine here shown for purpose of illustrating this invention comprises a stationary element or stator 10 having a magnetizable core 11, which is indicated in Fig. 2 as being made of laminations but which may be made in any other suitable form. The core 11 consists of a main or yoke portion 12 having teeth 13 extending therefrom to form a plurality of coil-retaining slots 14. A ring 15 forms a frame for supporting the core. The edges of this ring may be inturned so as to form abutments between which the core is supported as more fully described in, for example, Kayser Patent No. 1,812,748.

The slots 14 are provided with a liner 16 formed of a strong, tough laminated insulating material comprising fibrous material, such as paper, faced at least on one side with a continuous, coextensive adhering sheet of moisture-resisting material of high dielectric strength. Examples of such moisture-resisting material are cellulose derivatives and more specifically organic derivatives of cellulose such, for instance, as organic esters of cellulose and cellulose ethers. Examples of cellulose ethers are ethyl cellulose, methyl cellulose and benzyl cellulose. Examples of organic esters of cellulose are cellulose formate, cellulose acetate, cellulose triacetate, cellulose propionate and cellulose butyrate.

The liner 16 preferably is composed of a continuous sheet of paper united on each side thereof by any suitable means, for example by means of a thermoplastic adhesive, with a continuous coextensive sheet of cellulose acetate. In this way the inner fibrous layer is sealed with a moisture-resisting material, and there are no protruding fiber ends to absorb moisture in a wick-like manner as occurs in the case of slot liners formed of varnished paper or the like.

Suitable conductors 17 (Fig. 2) are provided in any suitable manner with a film of insulation, as for example, in the form of enamel. The enamel may be put on the copper wire by running it through a wire-enameling machine in a manner well known in the art. Usually, multiple films of oleo-resinous varnishes and the like are baked on the wire by heating at an elevated temperature such, for instance, as about 350° C. Wires insulated with a heat-treated product of condensing an aldehyde with a product of hydrolysis of a polyvinyl ester, as described in Patnode and Flynn Patent No. 2,085,995, are particularly suitable for use in practicing the present invention.

The insulated conductors 17 are wound in the lined slots 14. In the embodiment of the invention shown in the drawing the slots are shown as containing superposed layers of turns or sides of different coils and, specifically, a layer of coil sides of insulated motor-running conductor windings 18 and over that layer a second layer of coil sides of insulated motor-starting conductor windings 19 with a separator 20 therebetween. This separator preferably is formed of the same material used in lining the slots.

I have found that it is advantageous to use flexible insulating tubes or sleevings of high moisture resistance and dielectric strength for covering the connections between the individual coils and between the stator winding and the terminal wires leading from the stator. In Fig. 5 is shown a connection or union 21 formed by brazing, twisting together, or otherwise uniting the coil ends, over which connection is placed the sleeving 22. This sleeving preferably comprises an inner tube 23 of fibrous material, such as cloth, paper, etc., and preferably two plies of kraft paper, and a thin outer adhering wrapping 24 of cellulose derivative, preferably cellulose acetate, or other suitable material of high moisture resistance and dielectric strength.

The insulated conductor windings are retained in the slots 14 with wedges 25 (Fig. 3) which, like the slot liners 16 preferably extend, as shown in Fig. 2, beyond the end of the slots. In this way the insulation on the insulated conductors 17 is protected from injury during the winding operation. The wedges 25 preferably are formed of hard fiber rendered moisture resisting by soaking in, and coating with hot paraffin wax. By such treatment the fiber is coated and at least partly impregnated with wax.

To increase the edge tear strength of the slot liners 16, they are preferably folded over at their ends as shown at 26, Figs. 2 and 5.

The above-described system for insulating a stator of a dynamo-electric machine makes unnecessary a varnish treatment of the wound stator. This results in a material saving in time and in cost of producing a stator.

An unobvious result from the described insulation is the improved motor performance, particularly from a leakage current standpoint under high humidity conditions. The data shown in the table are illustrative of the substantial reduction in leakage current to ground of the new motor as compared with a motor having a stator insulated in accordance with conventional practice.

Table

|  | Conditions of insulation impedance test |  |  |  |  |  |  |  |
|---|---|---|---|---|---|---|---|---|
|  | After 24 hours in air at 85° F. and 85% relative humidity | | | | After 96 hours in air at 90° F. and 90% relative humidity | | | |
|  | R₀ | X₈ | Z | MA | R₀ | X₈ | Z | MA |
| Standard motor with varnish treatment: | | | | | | | | |
| 1 | 2.82 | .731 | .745 | .148 | 2.26 | .612 | .588 | .187 |
| 2 | 2.85 | .756 | .748 | .147 | 1.72 | .59 | .556 | .197 |
| 3 | 2.55 | .700 | .675 | .163 | 1.89 | .45 | .438 | .251 |
| New motor, insulated in accordance with this invention (no varnish treatment): | | | | | | | | |
| 1 | 4.32 | .90 | .88 | .125 | 4.0 | .752 | .73 | .150 |
| 2 | 4.32 | .93 | .91 | .121 | 4.13 | .783 | .755 | .146 |
| 3 | 4.17 | .903 | .88 | .122 | 3.75 | .76 | .74 | .149 |

Note:
R₀—Resistance component in megohms.
X₈—Capacitance component in megohms.
Z—Combined impedance (calculated).
MA—Milliamperes leakage current.

In manufacturing the new motor referred to in the table, both the slot insulation and the separator between the starting- and running-motor windings were composed of paper faced on each side with cellulose acetate. The sleeving over the coil connections was formed of a tube of paper having an outer wrapping of cellulose acetate. The improved results are attained chiefly by reason of the moisture-resisting properties of the cellulose acetate and because the paper is sealed with a sheet of the same. Such a sealing effect is not obtained when paper insulation of stators is coated with an insulating varnish.

The new slot insulation also provides certain advantages in the manufacturing operations. For example, the smooth surface of the insulation facilitates the winding of the coils in the slots, particularly in re-winding operations.

The slot insulation of this invention also may be used in insulating rotating members or rotors of dynamo-electric machines.

What I claim as new and desire to secure by Letters Patent of the United States is:

1. A dynamo-electric machine having a member comprising a core provided with a plurality of coil-winding slots, and a liner for each of said slots formed of a strong, tough, laminated insulating material comprising paper faced at least on one side with a continuous, coextensive adhering sheet of moisture-resisting, fiber-sealing material of high dielectric strength.

2. A member for a dynamo-electric machine comprising a core having a plurality of slots adapted to receive coil windings, and a slot liner for the walls defining each of said slots, said liner being composed of a strong, tough, moisture-resisting, high dielectric strength laminated material comprising a continuous sheet of paper united on each side thereof with a continuous coextensive sheet of cellulose derivative.

3. A dynamo-electric machine having a stationary member comprising a core provided with a plurality of slots, a liner for each of said slots, superposed layers of sides of different coils within in each of the lined slots, a separator of insulating material between each of said layers, said liner and separator each being formed of a strong, tough, high dielectric strength, abrasion- and moisture-resistant laminated material composed of a continuous sheet of paper united on each side thereof with a continuous coextensive sheet of cellulose ester.

4. A stationary member for a dynamo-electric machine comprising a core having a plurality of slots adapted to receive coil windings, and a liner in each of said slots consisting of a strong, tough, abrasion- and moisture-resitant, high dielectric strength laminated material comprising a continuous sheet of paper united on each side thereof with a continuous coextensive sheet of an organic ester of cellulose.

5. A dynamo-electric machine having a member comprising a core provided with a plurality of slots, a liner of strong, tough, flexible, moisture- and abrasion-resistant laminated material of high dielectric strength in each of said slots, a layer of coil sides of insulated motor-running conductor windings within the lined slots, a second layer of coil sides of motor-starting conductor windings over the said first layer, and a separator of insulating material between the said layers of coil sides, said separator being formed of a strong, tough, abrasion- and moisture-resistant, high dielectric strength laminated material composed of a continuous sheet of paper united on each side thereof with a continuous coextensive sheet of cellulose acetate.

6. A dynamo-electric machine having a member comprising a core provided with a plurality of open slots, a liner in each of said slots, superposed layers of sides of different coils within each of the lined slots, a separator of insulating material between each of said layers, a wedge formed of wax-coated hard fiber adapted to retain the said coil sides within each of said slots, the aforesaid liner and separator each being formed of a strong, tough, abrasion- and moisture-resistant, high dielectric strength laminated material composed of a continuous sheet of paper united on each side thereof with a continuous coextensive sheet of cellulose acetate.

7. A dynamo-electric machine including a stationary member comprising a core provided with a plurality of slots having a plurality of connected coils consisting of conductors covered with baked varnish film insulation, a liner in each of said slots, a flexible sleeving over the connections between the said coils, said liner and sleeving consisting of a strong, tough, flexible composite insulating material consisting of paper united at least on one side with a sheet of cellulose derivative.

8. A dynamo-electric machine having a stationary member comprising a core provided with a plurality of slots and a liner in each of said slots extending beyond the slot ends, said liner being formed of a strong, tough, abrasion- and moisture-resitant, high dielectric strength laminated material composed of a continuous sheet of paper united on each side thereof with a continuous coextensive sheet of cellulose acetate, the ends of said laminated material being folded over to increase the edge tear strength of said material.

9. A dynamo-electric machine having a member comprising a core provided with a plurality of coil-winding slots, and a liner for each of said slots formed of a strong, tough, laminated insulating material comprising paper faced on each side thereof with a continuous, coextensive sheet of cellulose ester.

10. A member for a dynamo-electric machine comprising a core having a plurality of slots adapted to receive coil windings, and a slot liner for the walls defining each of said slots, said liner comprising a strong, tough, moisture-resisting, high dielectric strength, laminated material consisting of a continuous sheet of paper having bonded to each side thereof a continuous coextensive sheet of cellulose acetate.

11. A motor having a member comprising a core provided with a plurality of slots adapted to receive coil windings, and a liner for each of said slots, said liner comprising a strong, tough, laminated insulating material formed of paper having united to at least one side thereof a continuous, coextensive sheet of moisture-resisting, fiber-sealing material of high dielectric strength.

12. A motor especially adapted to operate under high humidity conditions, said motor having a member comprising a core provided with a plurality of coil-winding slots, and a liner for each of said slots, said liner being formed of a strong, tough, laminated insulating material comprising paper having united to each side thereof a continuous, coextensive sheet of moisture-resisting, fiber-sealing material of high dielectric strength.

RALPH W. HALL.